US005895657A

United States Patent [19]

Fournet et al.

[11] Patent Number: 5,895,657
[45] Date of Patent: Apr. 20, 1999

[54] LIQUID VANILLIN COMPOSITIONS

[75] Inventors: Frédéric Fournet; Françoise Truchet, both of Lyons, France

[73] Assignee: Rhone-Poulenc Chimie, Courbevoie Cedex, France

[21] Appl. No.: 08/496,613

[22] Filed: Jun. 29, 1995

[30] Foreign Application Priority Data

Jun. 29, 1994 [FR] France .................................. 94 07995

[51] Int. Cl.$^6$ ...................................................... A61K 7/48
[52] U.S. Cl. ........................... 424/401; 424/47; 424/69; 424/701; 424/73; 514/699; 514/844; 514/845; 514/846; 514/944; 510/119; 510/136; 512/20
[58] Field of Search ........................ 424/401, 701, 424/47, 69, 73; 514/699, 844, 845, 846, 944; 510/119, 136; 512/20

[56] References Cited

U.S. PATENT DOCUMENTS 4,201,765  5/1980  Sichak ........................................ 424/45

FOREIGN PATENT DOCUMENTS

| 0557174 | 8/1993 | European Pat. Off. . |
| 1692376 | 2/1972 | Germany . |
| 1165750 | 10/1969 | United Kingdom . |
| 87/00051 | 1/1987 | WIPO . |
| 89/05589 | 6/1989 | WIPO . |

OTHER PUBLICATIONS

Database WPI, Section Ch, Week 9316, Derwent Publications Ltd., London, GB; AN 93-128348 & HU-B-206 817 (Egal Vegyipari Koezoes Vallalat), Jan. 28, 1993.

Database WPI, Section Ch, Week 9108, Derwent Publications Ltd., London, GB; AN 91-055551 & JP-A-03 007 21 (Pentel KK), Jan. 14, 1991.

*Primary Examiner*—Jyothsna Venkat
*Attorney, Agent, or Firm*—Burns, Doane, Swecker & Mathis, L.L.P.

[57] ABSTRACT

Liquid vanillin compositions, well suited as flavoring/perfuming agents for a wide variety of applications, for example in human and animal foodstuffs, cosmetics and perfumes, comprise (a) vanillin, (b) ethylvanillin and (c) an aqueous and/or organic solvent therefor.

12 Claims, No Drawings

LIQUID VANILLIN COMPOSITIONS

BACKGROUND OF THE INVENTION

1. Technical Field of the Invention

The present invention relates to novel forms of vanillin, and more especially to vanillin compositions in liquid state, to a process for the preparation, and to a wide variety of applications therefor.

2. Description of the Prior Art

Vanillin is a compound which is widely used in numerous fields and industries as a flavoring agent and/or perfume.

Vanillin is thus widely used in the human and animal foodstuff industry, but it also has applications in other fields such as pharmacy or perfumery. It is consumed in vast amounts.

Vanillin is currently commercially available in the form of a crystalline powder. This presents the drawback of producing fine particles which create problems of dusting and flowability during storage and manipulation or handling of the powder.

For many applications, it is preferable for these ingredients to be in liquid form. In addition to the fact that this form obviates the problem of dusting and flowability, a liquid formulation presents many advantages, in particular ease of metering and easier manipulation.

Since the solubility of vanillin in water is very low, on the order of 0.5% at 20° C. and 30% in ethanol, it has been difficult to provide concentrated solutions of vanillin in the form required by the user.

Thus, need continues to exist for a novel formulation of vanillin which will satisfy the following criteria:

(a) to be in the form of a liquid product which can be poured or pumped at room temperature, on the order of 15° C. to 25° C., (b) to have a high concentration of active agent of 20% to 80% by weight, more generally ranging from 50% to 70%, (c) to be mechanically stable, i.e., it must not separate into phases when the temperature varies within a zone of 0° C. to 50° C., and must not crystallize during prolonged storage, (d) to be chemically stable, (e) to be easy to use, i.e., simply dilute for use, (f) to be in the form of a transparent solution, (g) to be bacterially stable and not constitute a favorable medium for the development of bacteria under optimal conditions, (h) to satisfy organoleptic requirements in the case of food use, (i) to conform with environmental and other legislation in the field under consideration, (j) to be easy to produce as not to increase the selling price.

SUMMARY OF THE INVENTION

Accordingly, a major object of the present invention is the provision of improved vanillin compositions satisfying the above criteria.

Briefly, the present invention features novel vanillin compositions, in liquid form, comprising:

(a) 30% to 80% by weight of vanillin, (b) 20% to 70% by weight of ethylvanillin, and (c) an aqueous and/or organic solvent, in an amount sufficient to produce a solution at the desired temperature.

DETAILED DESCRIPTION OF BEST MODE AND PREFERRED EMBODIMENTS OF THE INVENTION

More particularly according to the present invention, in a preferred embodiment thereof, the subject vanillin compositions comprise:

(a) 45% to 50% by weight of vanillin, (b) 50% to 55% by weight of ethylvanillin, and (c) an aqueous and/or organic solvent, in an amount sufficient to produce a solution at the desired temperature.

The solvent must be liquid at room temperature, i.e., generally a temperature ranging from 10° C. to 25° C., typically ranging from 16° C. to 22° C.

It must be chemically inert with respect to vanillin and ethylvanillin.

Suitable solvents for use in the compositions of the invention are preferably a polar, protic or aprotic solvent, or a mixture of solvents.

Exemplary such solvents include:

(1) water;

(2) monoalcohols or diols, preferably aliphatic or arylaliphatic alcohols, more preferably methanol, ethanol, propanol, isopropanol, butanol, β-phenylethyl alcohol, ethylene glycol, diethylene glycol, propylene glycol and glycerol;

(3) ether-oxides, preferably aliphatic ether-oxides, more preferably diethylether, dipropylether, diisopropylether, dibutylether, methyltertiobutylether, ethyltertiobutylether, ditertiobutylether, ethylene glycol dimethylether, and diethylenegylcol dimethylether;

(4) alkyl or aralkyl esters of alphatic, cycloaliphatic or aromatic carboxylic acids, preferably ethyl acetate, butyl acetate, benzyl salicyclate, methyl laurate, methyl benzoate, and ethyl citrate.

From among these solvents, water, ethanol, propylene glycol and mixtures thereof are the preferred.

The solvent is selected taking account of the desired application. Thus, when the compositions of the invention are used in thee food industry, it is imperative that the solvent be nontoxic and permitted by applicable environmental and other laws.

The novel compositions of the invention combine the two constituents vanillin and ethylvanillin in the proportions described above.

The amount of solvent used will be higher when the temperature at which it is used is lower.

The amount of solvent used, expressed by weight with respect to the dry solids (vanillin+ethylvanillin), is preferably 5% to 50%, more preferably 10% to 30%, for a temperature of 25° C.

The process for the preparation of the vanillin based compositions of the invention will now be more fully described.

Said process for the preparation of these compositions comprises intimately mixing vanillin, ethylvanillin and the solvent, with stirring, next heating the mixture obtained to produce a liquid which is then recovered.

In a preferred embodiment of the invention, the vanillin and the ethylvanillin are introduced into the stirred solvent.

The mixture is then heated to a temperature which is preferably less than 50° C., more preferably ranging from 20° C. to 50° C., even more preferably ranging from 30° C. to 40° C.

The mixture is stirred until a homogeneous solution is obtained. In general, this requires from 10 to 60 min.

The liquid composition is then recovered and is packaged depending on the intended application therefor.

The compositions of the invention can be used in a number of fields, among them the food and pharmaceutical industry and the perfume industry.

A preferred field for the compositions of the invention is the cake and biscuit industry, in particular:

(i) biscuits: conventional sweet biscuits, petits beurre, digestive biscuits, sandwich biscuits, shortbread, (ii) cakes: boudoirs, finger biscuits, sponge fingers, Genoa cake, genoese cake, madeleines, pound cake, fruit cake, marzipan cakes, petits fours.

The basic constituents of the mixtures used in the above industries are proteins (gluten) and starch which are usually provided by wheat flour. To prepare the various types of biscuits and cakes, the flour contains ingredients such as saccharose, salt, eggs, milk, fats, optional chemical rising agents (sodium bicarbonate or other artificial rising agents) or biological rising agents and flours or other cereals, etc.

The vanillin compositions of the invention are incorporated during manufacture, depending on the desired product, and this is carried out using conventional techniques in the appropriate industry (see, in particular, J. L. Kiger and J. C. Kiger, *Techniques Modernes de la Biscuiterie*, Pâtisserie-Boulangerie industrielles et artisanales, Dunod, Paris, 1968, Volume 2, pp. 231 ff).

Preferably, the compositions of the invention are introduced into the fats used to prepare the dough.

An exemplary amount of the composition of the invention which is introduced is 0.07 to 0.17 g per kg of dough.

The vanillin compositions of the invention are very well suited for the chocolate industry in any form: chocolate bars, cooking chocolate or chocolate centers.

They can be introduced during formulation, i.e., mixing the cocoa paste with the other ingredients, in particular flavoring agents, or after formulation in the cocoa butter.

For this application, the amount of vanillin compositions of the invention, depending on the type of chocolate, ranges from 0.05 g to 0.1 g per kg of finished product; the greatest amounts are used in cooking chocolate.

Another use for the compositions of the invention is in the production of all types of confectionery, e.g., dragees, toffeess, nougats, boiled sweets, fondants, etc.

They are preferably introduced into the liquid phase.

The amount of vanillin introduced depends on whether the desired flavor is to be stronger or weaker. Thus, the amounts of the compositions of the invention can vary from 0.001% to 0.2%.

The compositions of the invention are also well suited for use in the dairy industry, in particular in flavored and gelled milk products, milk desserts, yogurts, water ices and ice creams.

The flavoring is by simple addition of the compositions of the invention, during one of the mixing stages required during manufacture of the product.

The amounts of these compositions are generally low, on the order of 0.02 g per 1 kg of finished product.

Yet another application for the compositions of the invention in the food industry is in the preparation of vanillin sugar, i.e., impregnating sugar with the subject compositions, in an amount on the order of 7 g per kg of finished product.

The compositions of the invention can also be used in different drinks and beverages, including grenadine and chocolate flavored drinks.

Vanillin is frequently used for denaturing butter. The vanillin compositions of the invention can in this respect be used in an amount of 6 g per tonne of butter.

The compositions of the invention can also be used in the animal foodstuffs industry, in particular for the preparation of meal for cattle and pig feeds. The recommended amount is about 0.2 g per kg of flour to be flavored.

The compositions of the invention too can be used as a masking agent in the pharmaceutical industry (to mask the scent of a medication) or for other industrial products (gum, plastic rubber, etc.).

They can also be used in such varied industries as the cosmetics, perfume or detergent industry.

They can be used in cosmetics such as creams, lotions, gels, milks, makeup and other products and also as perfuming ingredients in perfume compositions, perfumed substrates and perfumed products.

By the term "perfumed products" are intended mixtures of ingredients such as solvents, solid or liquid supports, vehicles or carriers, fixatives, various scenting compositions, and the like, into which the compositions of the invention are incorporated, and which are employed to produce the various types of finished products having the desired fragrance.

Perfume bases constitute preferred examples of perfuming compositions in which the compositions of the invention can advantageously be incorporated in an amount of 0.1% to 2.5% by weight.

The perfume bases can be used for the preparation of many perfumed products such as toilet water, perfume, after-shave lotions; beauty and hygiene products such as bath or shower gels, deodorizing or antiperspirant products in stick or lotion form; any type of talc or powder; or hair products such as shampoos and any other type of haircare product.

The compositions of the invention can also be used in the soap industry. They can be incorporated in an amount of 0.3% to 0.75% of the total mass to be perfumed. In general, for this application the vanillin is combined with benjamin resin and sodium hyposulfite (2%).

The vanillin compositions of the invention have many other applications, in particular in room deodorizers or any cleaning material.

Additives required for the intended application can be incorporated into the compositions of the invention without departing from the scope thereof.

In order to further illustrate the present invention and the advantages thereof, the following specific examples are given, it being understood that same are intended only as illustrative and in nowise limitative.

In said examples to follow, all parts and percentages are given by weight, unless otherwise indicated.

EXAMPLES

The following examples evidence that the compositions of the invention can dissolve larger amounts of vanillin.

The operating procedure described below was employed:

A mixture of a liquid/solid suspension comprising the following reagents was formed in a 2 liter double-envelope stirred reactor:

(a) solvent (a single solvent or a mixture of solvents), (b) a solute (pure product or mixture of products).

The temperature of the reactor was controlled, regulated and measured. It was maintained constant throughout the test.

At this temperature, using an extraction system (slight pressurization of the reactor and extraction through a filter), the liquid, in solubility equilibrium with the solid phase, was removed. Chemical analysis and/or measurement of the dry solids provided the solubility of the solute in the solvent at the fixed temperature.

To ensure that the solubility equilibrium had been attained, several measurements were taken until a constant result was obtained.

Examples 1 to 4

Compositions in accordance with the invention were prepared containing vanillin, ethylvanillin and a mixture of 60% by weight of water and 40% by weight of methanol as the solvent.

In Examples 3 and 4, a mixture of 80% by weight of vanillin and 20% of ethylvanillin (Example 3) and a mixture of 48% by weight of vanillin and 52% of ethylvanillin (Example 4) were employed.

For purposes of comparison, vanillin alone (Example 1) and ethylvanillin alone (Example 2) were also used.

The amount of solute in 100 g of solution in the above solvents was measured.

The solubilities obtained were determined at two temperatures, 10° C. and 20° C.

The results obtained are reported in Table I:

TABLE I

| | Solubility (g solute per 100 g of solution) | | | |
|---|---|---|---|---|
| Example | 1 | 2 | 3 | 4 |
| Solute | Vanillin | ethyl-vanillin | 80% vanillin 20% ethyl-vanillin | 48% vanillin 52% ethyl-vanillin |
| 10° C. | 5 | 2 | 21 | 60 |
| 20° C. | 15 | 4 | 40 | 70 |

It will clearly be seen from Table I that far more vanillin was dissolved at the same temperature using the composition of the invention.

Example 5

This is an example of the use of the composition of the invention for the synthesis of butter flavoring.

A composition contained:

(i) 53.4% by weight of vanillin, (ii) 26.6% by weight of ethylvanillin, (iii) 20% by weight of propylene glycol.

10 g of the above composition were introduced into a mixture containing 5 g of butyric acid, 1.5 g of diacetyl, 0.02 g of citral and 83.5 g of propylene glycol.

According to the invention, the addition of powder was eliminated and, thus, the preparative technique was greatly simplified.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A liquid solution vanillin composition of matter, comprising (a) from 30% to 80% by weight of vanillin, (b) from 20% to 70% by weight of ethylvanillin, and (c) from 5% to 50% by weight of an aqueous solvent, an organic solvent, or mixture thereof to provide said solution at a temperature of 25° C., based on the dry solids content of said vanillin (a)+ethylvanillin (b), wherein the concentration of the vanillin and ethylvanillin together is at least 20% by weight based on the liquid solution.

2. The liquid vanillin composition as defined by claim 1, wherein said solvent (c) is water or an organic, polar, protic or aprotic solvent, or mixture thereof.

3. The liquid vanillin composition as defined by claim 1, wherein said solvent (c) is water, a monoalcohol or diol, an ether, or an alkyl or aralkyl ester of an aliphatic, cycloaliphatic or aromatic carboxylic acid, or mixture thereof.

4. The liquid vanillin composition as defined by claim 3, wherein said solvent (c) is methanol, ethanol, propanol, isopropanol, butanol, β-phenylethyl alcohol, ethylene glycol, diethylene glycol, propylene glycol, glycerol, diethylether, dipropylether, diisopropylether, dibutylether, methyltertiobutylether, ethyltertiobutylether, ditertiobutylether, ethylene glycol dimethylether, diethylenegylcol dimethylether, ethyl acetate, butyl acetate, benzyl salicyclate, methyl laurate, methyl benzoate, ethyl citrate, or mixture thereof.

5. The liquid vanillin composition as defined by claim 3, wherein said solvent (c) is water, ethanol, propylene glycol, or mixture thereof.

6. The liquid vanillin composition as defined by claim 1, comprising from 10% to 30% by weight of said solvent (c).

7. A cosmetic or perfume comprising the liquid vanillin composition as defined by claim 1.

8. A pharmaceutical comprising the liquid vanillin composition as defined by claim 1.

9. A cleaning agent or detergent comprising the liquid vanillin composition as defined by claim 1.

10. The liquid vanillin composition as defined by claim 1, wherein the concentration of the vanillin and ethylvanillin together is in the range of from 20% to 80% by weight based on the liquid solution.

11. A liquid vanillin composition of matter, comprising (a) from 45% to 50% by weight of vanillin, (b) from 50% to 55% by weight of ethylvanillin and (c) an effective amount of an aqueous solvent, an organic solvent, or mixture thereof to provide said solution at a predetermined temperature wherein the concentration of the vanillin and ethylvanillin together is at least 20% by weight based on the liquid solution.

12. A liquid solution vanillin composition of matter, comprising (a) from 30% to 80% by weight of vanillin, (b) from 20% to 70% by weight of ethylvanillin, and (c) from 5% to 50% by weight of water, methanol, ethanol, propylene glycol, or mixture thereof, at a temperature of 25° C., based on the dry solids content of said vanillin (a)+ethylvanillin (b) to provide said solution at a predetermined temperature, wherein the concentration of the vanillin and ethylvanillin together is at least 20% by weight based on the liquid solution.

* * * * *